(12) United States Patent
Sasadai

(10) Patent No.: US 10,624,139 B2
(45) Date of Patent: Apr. 14, 2020

(54) COMMUNICATION DEVICE AND STORAGE MEDIUM SUITABLE FOR CONNECTION TO WIRELESS LAN (LOCAL AREA NETWORK)

(71) Applicant: KYOCERA Document Solutions Inc., Osaka (JP)

(72) Inventor: Koji Sasadai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 43 days.

(21) Appl. No.: 15/631,665

(22) Filed: Jun. 23, 2017

(65) Prior Publication Data

US 2018/0027599 A1    Jan. 25, 2018

(30) Foreign Application Priority Data

Jul. 21, 2016    (JP) ................................ 2016-142895

(51) Int. Cl.
*H04W 76/11* (2018.01)
*H04L 29/08* (2006.01)
(Continued)

(52) U.S. Cl.
CPC ......... *H04W 76/11* (2018.02); *H04L 61/6022* (2013.01); *H04L 67/104* (2013.01); *H04L 69/324* (2013.01); *H04W 80/02* (2013.01)

(58) Field of Classification Search
CPC ..... H04W 76/11; H04W 80/02; H04L 69/324; H04L 67/104; H04L 61/6022
See application file for complete search history.

(56) References Cited

U.S. PATENT DOCUMENTS

2006/0045272 A1    3/2006  Ohaka
2006/0089987 A1*   4/2006  Igarashi ............ H04L 29/12783
                                                              709/225
(Continued)

FOREIGN PATENT DOCUMENTS

JP    2003-124939 A    4/2003
JP    2006-067174 A    3/2006
(Continued)

OTHER PUBLICATIONS

Japan Patent Office. Office Action. dated Jan. 29, 2019.

*Primary Examiner* — Ajit Patel
*Assistant Examiner* — Wilfred Thomas
(74) *Attorney, Agent, or Firm* — Hawaii Patent Services; Nathaniel K. Fedde; Kenton N. Fedde

(57) ABSTRACT

Provided is a communication device that prevents a shortage of wireless LAN resources. A communication-control unit controls wireless communication via an access point and P2P type communication (P2P communication), a connection-information-management unit manages a MAC address list in which MAC addresses of portable terminals from which there is a connection request by wireless communication are registered, and when the communication-control unit receives a connection request from a portable terminal by wireless communication, a system-control unit compares the MAC address that is included in the connection request with the MAC address list, and responds to the connection request when the MAC address is not registered in the MAC address list. As a result, unintended connection requests are prevented from being received from the portable terminal side.

4 Claims, 7 Drawing Sheets

(51) Int. Cl.
*H04L 29/12* (2006.01)
*H04W 80/02* (2009.01)
*H04W 76/14* (2018.01)

(56) References Cited

U.S. PATENT DOCUMENTS

| | | | | |
|---|---|---|---|---|
| 2010/0115587 A1* | 5/2010 | Kubota | ............... | G06F 21/34 |
| | | | | 726/3 |
| 2014/0320886 A1 | 10/2014 | Uchikawa | | |
| 2015/0215973 A1* | 7/2015 | Nguyenvan | ........... | H04W 76/10 |
| | | | | 370/329 |
| 2016/0219329 A1* | 7/2016 | Jee | ................. | H04N 21/4367 |

FOREIGN PATENT DOCUMENTS

| | | |
|---|---|---|
| JP | 2006-192645 A | 7/2006 |
| JP | 2014-216913 A | 11/2014 |

* cited by examiner

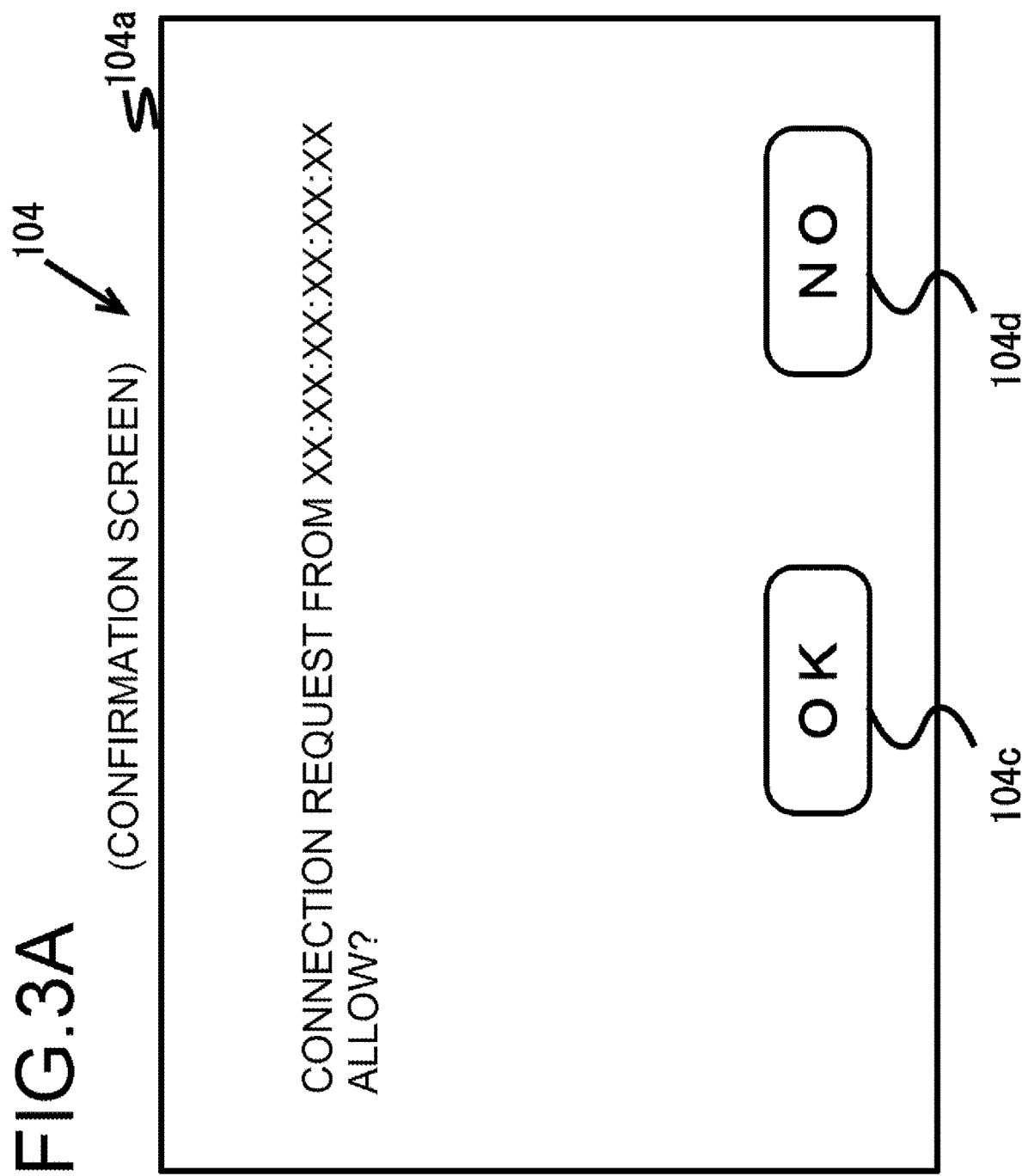

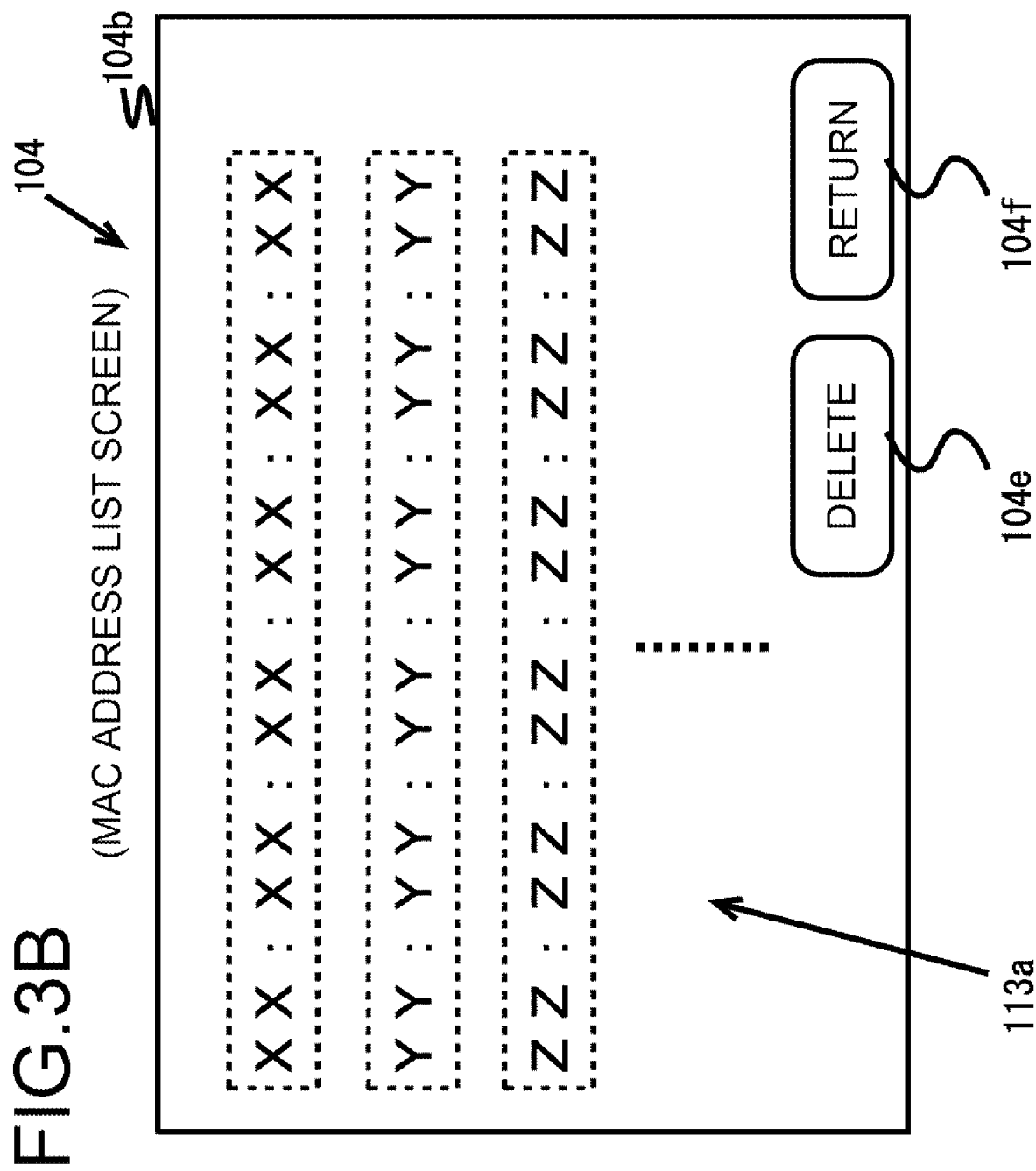

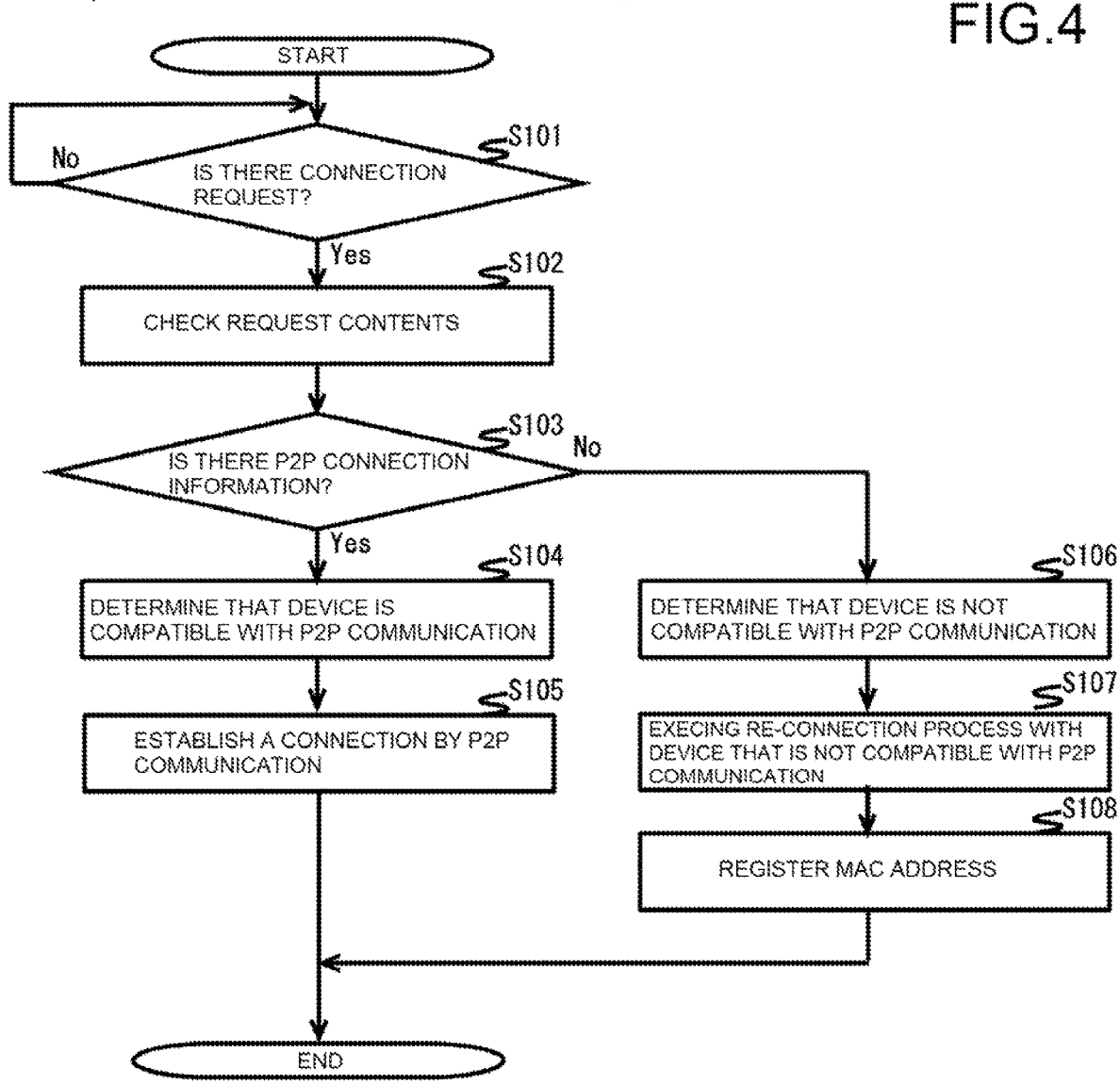

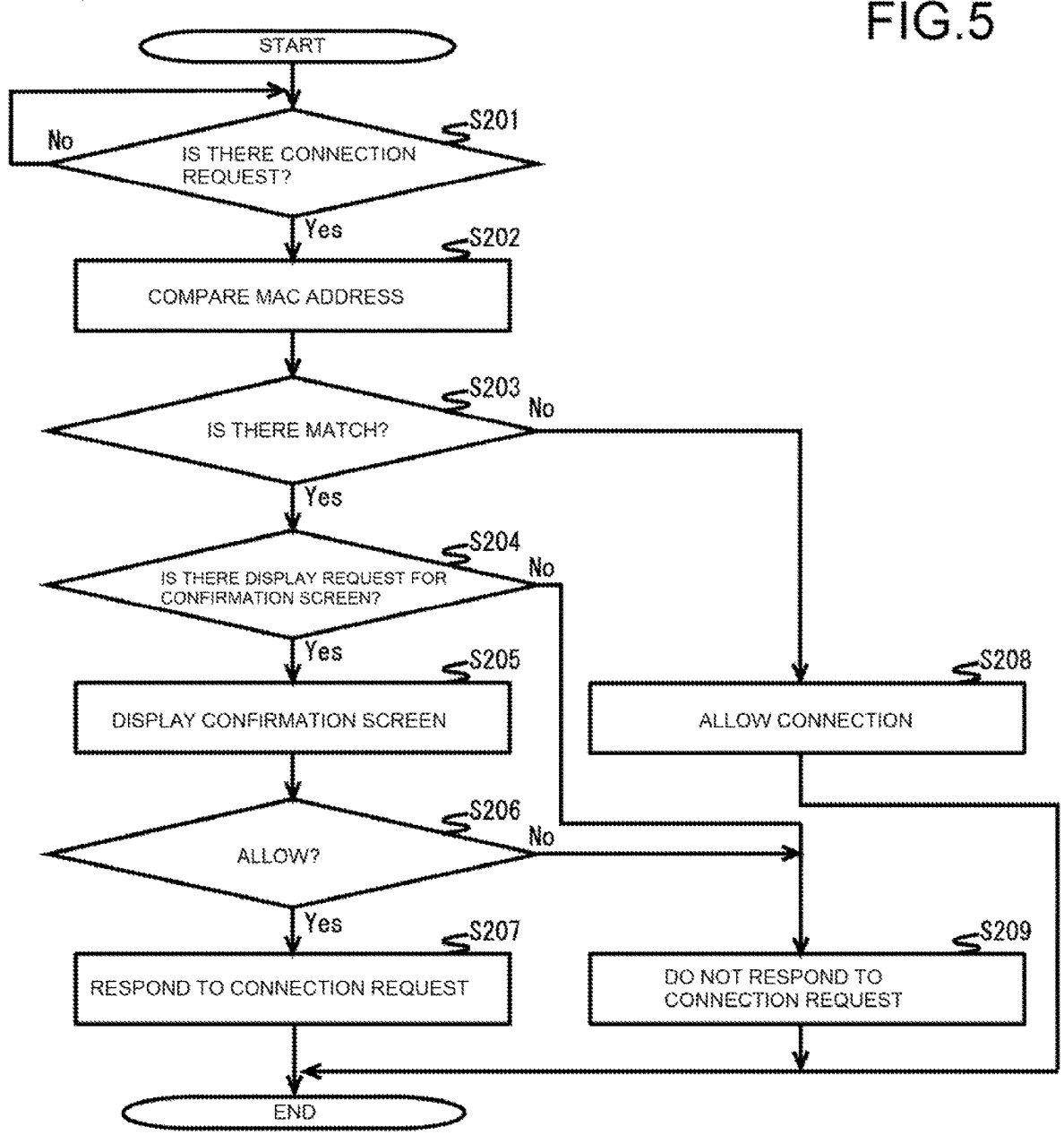

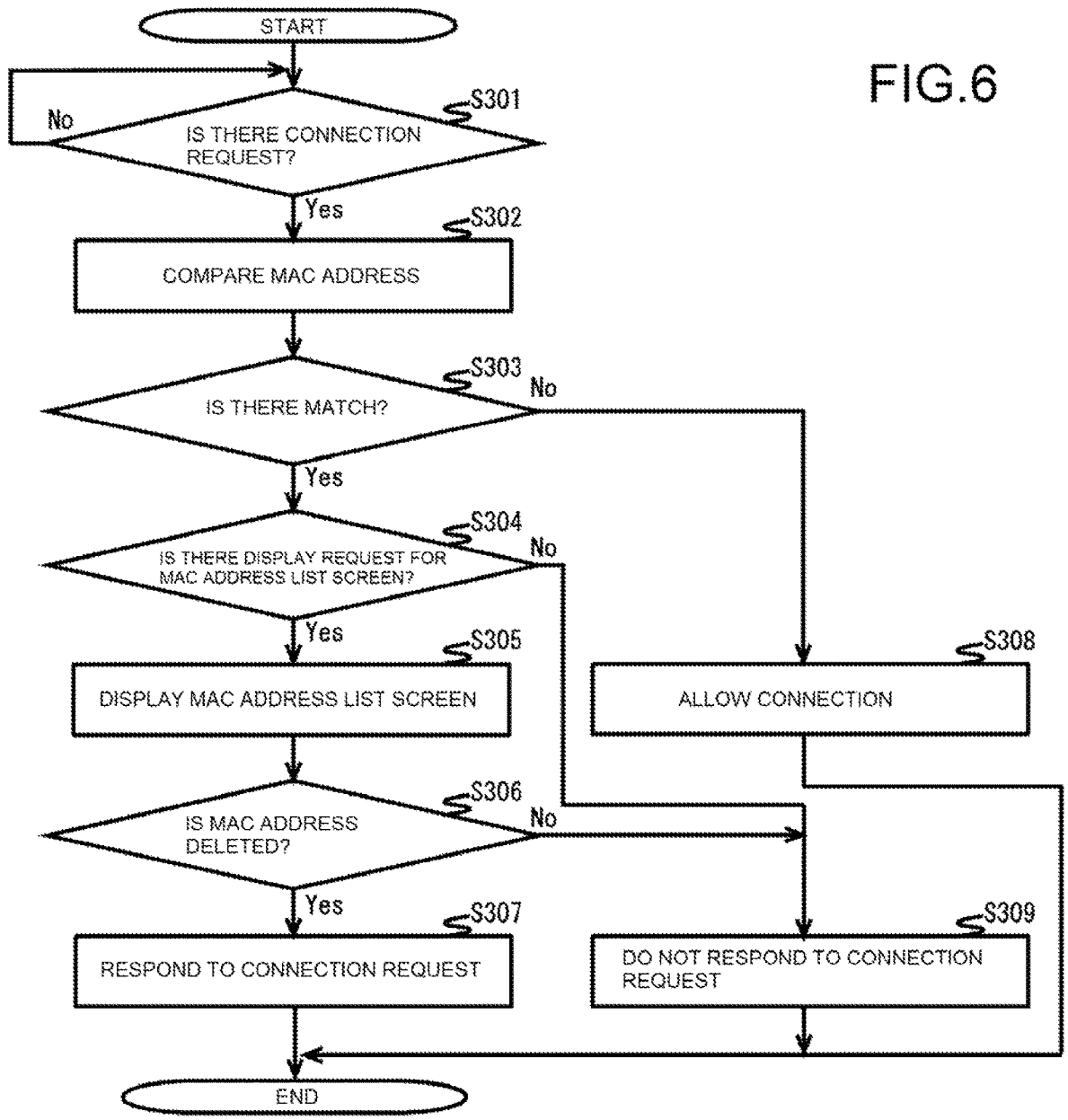

COMMUNICATION DEVICE AND STORAGE MEDIUM SUITABLE FOR CONNECTION TO WIRELESS LAN (LOCAL AREA NETWORK)

INCORPORATION BY REFERENCE

This application is based on and claims the benefit of priority from Japanese Patent Application No. 2016-142895 filed on Jul. 21, 2016, the contents of which are hereby incorporated by reference.

BACKGROUND

The present disclosure relates to a communication device and storage medium suitable for connection to a wireless LAN (Local Area Network).

Typically, in devices such as portable terminals and image-forming apparatuses that are compatible with P2P (Peer to Peer) communication and that include a function for communication based on the P2P (Peer to Peer) method (for example, Wi-Fi Direct (registered trademark) as a wireless LAN) (hereafter, referred to as P2P (Peer to Peer) communication), it is possible to transmit and receive data directly even when there is no access point (AP) in Wi-Fi (registered trademark) communication (Ad-hoc mode).

In typical technology related to this kind of P2P communication, it is determined whether or not a specified external device of a communicating party satisfies specified conditions, and when that device does not satisfy the specified conditions, whether or not to execute wireless communication with that device is determined based on a user instruction. When it is determined that the device does satisfy specified conditions, there are communication devices that determine whether to operate as an access point or to operate as a client.

SUMMARY

The communication device according to the present disclosure includes a communication-control unit, a connection-information-management unit, and a system-control unit. The communication-control unit controls first communication by wireless communication via an access point, and second communication by P2P type communication. The connection-information-management unit manages a MAC address list in which MAC addresses of clients from which there has been a connection request by the first communication are registered. When the communication-control unit receives a connection request from the client by the first communication, the system-control unit compares the MAC address that is included in the connection request with the MAC address list, and when the MAC address is not registered in the MAC address list, responds to the connection request.

The non-transitory computer readable recording medium according to the present disclosure stores a communication program that can be executed by a computer of a communication device. When the communication program is executed, the communication program causes the computer to: by a communication-control unit, control first communication by wireless communication via an access point, and second communication by P2P type communication; by a connection-information-management unit, manage a MAC address list in which MAC addresses of clients from which there has been a connection request by the first communication are registered; when a communication-control unit receives a connection request from the client by the first communication, by a system-control unit, compare the MAC address that is included in the connection request with the MAC address list, and when the MAC address is not registered in the MAC address list, respond to the connection request.

BRIEF DESCRIPTION OF THE DRAWINGS

FIG. 3A illustrates, as an example of contents displayed on a panel unit of the MFP in FIG. 1, a selection screen that prompts selection of whether or not to allow a connection request from a portable terminal.

FIG. 3B illustrates, as an example of contents displayed on a panel unit of the MFP in FIG. 1, an example of a MAC address list that registers MAC addresses of portable terminals from which there has been a connection request.

FIG. 4 illustrates steps of a connection process on the MFP side in FIG. 1 when determining whether or not a portable terminal is P2P compatible.

FIG. 5 illustrates, as an example of a re-connection process on the MFP side in FIG. 1, steps when there is a display request for displaying a confirmation screen.

FIG. 6 illustrates, as another example of a re-connection process on the MFP side in FIG. 1, steps when there is a display request for displaying a MAC address list screen.

DETAILED DESCRIPTION

Figure 1:
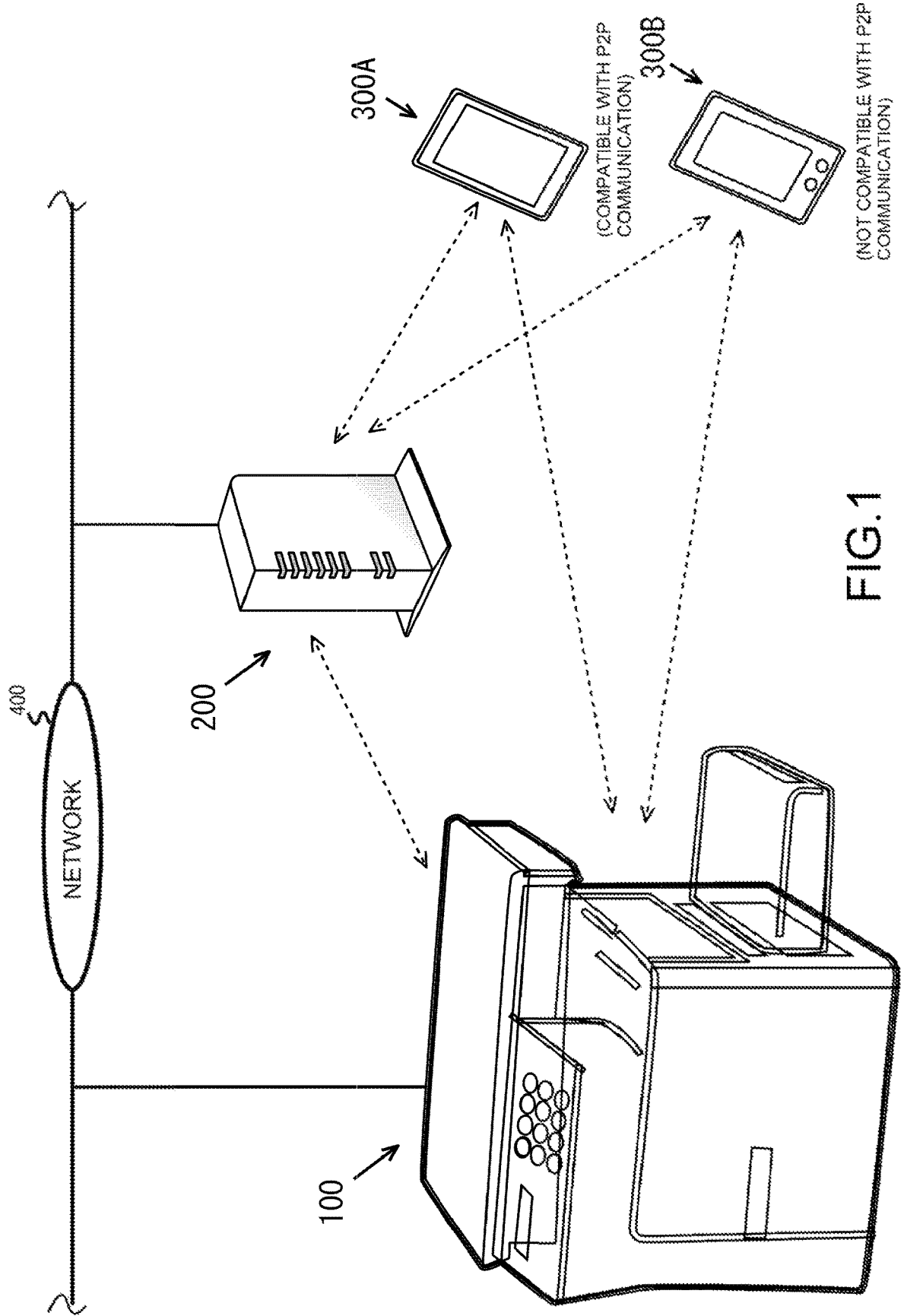
FIG. 1 illustrates an example of a communication system of an embodiment of a communication device of the present disclosure.

In the following, an embodiment of a communication device of the present disclosure will be explained while referencing FIG. 1 to FIG. 6. FIG. 1 is a diagram illustrating an example of a communication system of an embodiment of a communication device of the present disclosure. A MFP (Multifunction Peripheral) that is a complex image-forming apparatus having, for example, a printing function, copying function, FAX function, data transmission/reception function via a network 400, and the like is presumed as the communication device illustrated in FIG. 1.

First, as illustrated in FIG. 1, a communication system includes a MFP 100, a relay device 200, and portable terminals 300A, 300B. The MFP 100 has a wireless LAN communication function or the like based on at least Wi-Fi (registered trademark) and Wi-Fi Direct (registered trademark) standards. In the following, communication via a Wi-Fi communication access point is simply called wireless communication, and communication based on Wi-Fi Direct (registered trademark) is referred to as P2P (Peer to Peer) communication.

The relay device 200 is a wireless LAN access point. The portable terminal 300A has at least wireless communication and P2P communication functions and the like. In other words, portable terminal 300A is compatible with P2P communication. However, portable terminal 300B has at least a wireless communication function and the like, however does not have a P2P communication function. That is, the portable terminal 300B is not compatible with P2P communication. The portable terminals 300A, 300B can be connected to a MFP 100 or a network 400 via the relay device 200.

Figure 2:
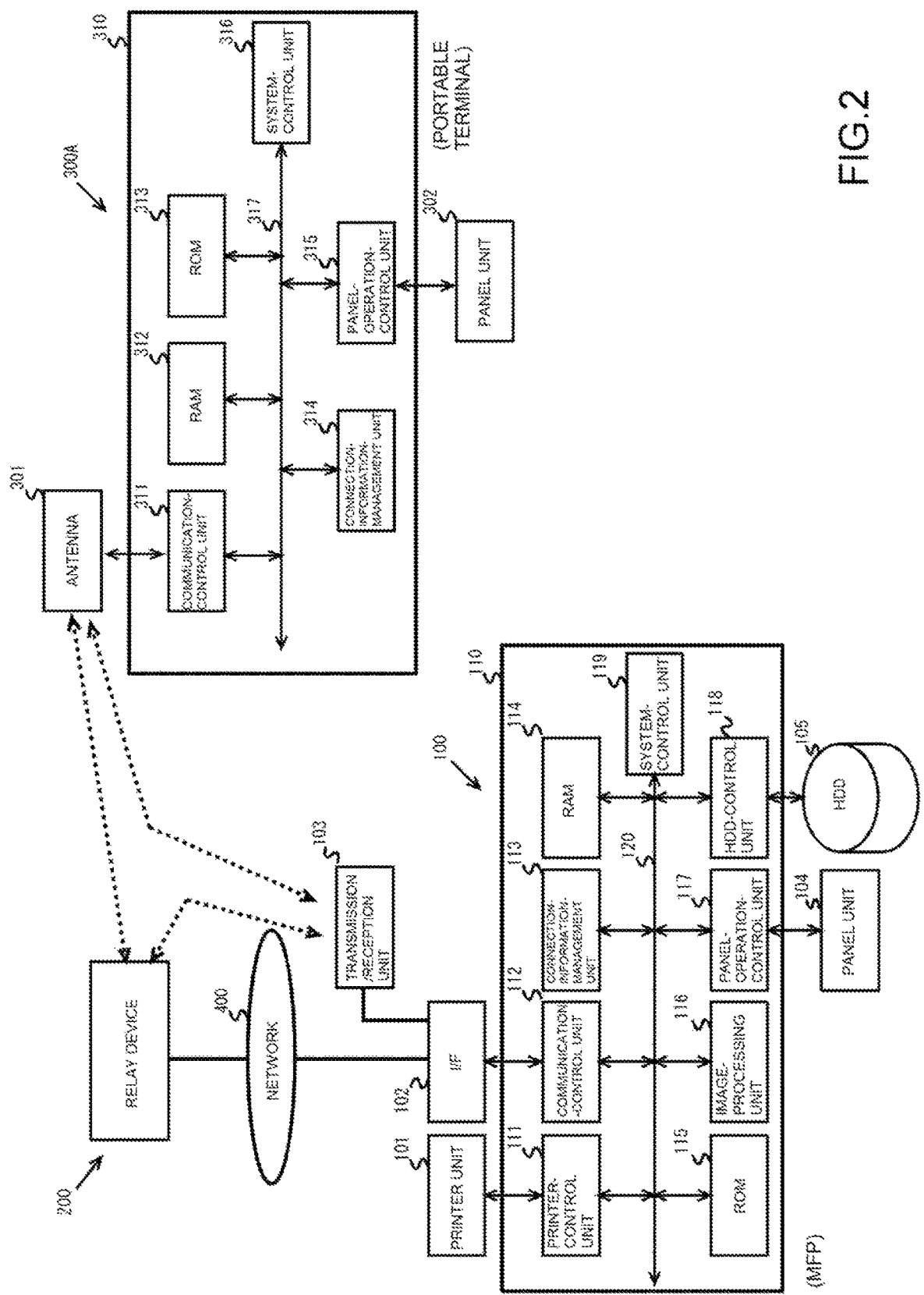
FIG. 2 illustrates an example of configuration of the MFP and portable terminal in FIG. 1.

Next, an example of the configuration of the MFP 100 and portable terminals 300A, 300B will be explained with reference to FIG. 2. In the following, the configuration of the portable terminals 300A, 300B are mostly the same, so portable terminal 300A will be explained as a representative.

First, the MFP 100 includes a control unit 110 that controls a printer unit 101, an I/F 102, a transmission/reception unit 103, a panel unit 104, and a HDD (Hard Disk Drive) 105. The MFP 100 may also include a scanner unit, a FAX unit and the like.

The printer unit 101 is a device for printing images on paper based on printing data that is outputted from the control unit 110. The I/F 102 is in charge of communication with the portable terminal 300A via the network 400. The I/F 102 is also in charge of communication with the portable terminal 300A via the transmission/reception unit 103. As the I/F 102, it is necessary that one be provided to be responsible for communication via the network 400, and that one be separately provided to be responsible for communication via the transmission/reception unit 103, however, for convenience of explanation, I/F 102 is illustrated as being one. Moreover, the I/F 102 may also be in charge of communication with a content server, web server and the like.

The transmission/reception unit 103 receives and transmits radio waves by wireless communication and P2P communication. The panel unit 104 is a device such as a touch panel that performs a display for the printing function, the copying function, the FAX function, the data transmission/reception function via a network, and various settings of the MFP 100. Moreover, the panel unit 104, as will be explained in detail later, displays a confirmation screen 104a that prompts selection of whether or not to allow a connection request, and a MAC address list screen 104b that prompts deletion of a MAC (Media Access Control) address.

The HDD 105 is a storage device that stores application programs and the like for providing the various functions of the MFP 100. Moreover, the HDD 105 has user boxes for storing printing jobs that are registered, for example, from portable terminals 300A, 300B, and user terminal.

The control unit 110 is a processor that controls the overall operation of an MFP 100 by executing an image-forming program, control program and the like. The control unit 110 includes a printer-control unit 111, a communication-control unit 112, a connection-information-management unit 113, a RAM 114, a ROM 115, an image-processing unit 116, a panel-operation-control unit 117, a HDD-control unit 118, and a system-control unit 119. Moreover, these units are connected to a data bus 120. The printer-control unit 111 controls the printing operation of the printer unit 101. The communication-control unit 112, via the I/F 102, controls communication via the network 400, and communication via the transmission/reception unit 103. It is necessary that one communication-control unit 112 be provided to be responsible for communication via the network 400, and that one be separately provided to be responsible for communication via the transmission/reception unit 103, however, for convenience of explanation the communication-control unit 112 is illustrated as being one.

The connection-information-management unit 113 manages wireless-communication-dedicated software for executing wireless communication, P2P-communication-dedicated software for executing P2P communication, and connection information. Moreover, the connection-information-management unit 113, following an instruction from the system-control unit 119, activates the wireless-communication-dedicated software and P2P-communication-dedicated software. The connection information includes a SSID (Service Set Identifier), an encryption key, a MAC address and the like. The connection-information-management unit 113 also manages a MAC address list 113a described later.

The RAM 114 is a work memory for executing programs. A control program for checking the operation of each of the units and the like is stored in the ROM 115. The image-processing unit 116 performs image processing (rasterization) on printing jobs that are registered in the user boxes of the HDD 105, for example. The system-control unit 119 temporarily stores printing data that has undergone image processing by the image-processing unit 116 in the RAM 114.

The panel-operation-control unit 117 controls the display operation of the panel unit 104. Moreover, the panel-operation-control unit 117, via the panel unit 104, receives start settings for printing, copying, FAX, data transmission/reception via a network and the like. Furthermore, the panel-operation-control unit 117, via the panel unit 104, receives a selection of whether or not to allow a connection request via the confirmation screen 104a (described later). The panel-operation-control unit 117, via the panel unit 104, also receives the deletion of MAC addresses via the MAC address list screen 104b (described later). The HDD-control unit 118 controls reading data from and writing data to the HDD 105.

The system-control unit 119 controls cooperative operation of each unit. Moreover, the system-control unit 119 determines whether or not there is P2P compatibility based on a connection request received by the communication-control unit 112. When there is a connection request from the portable terminal 300B that is not compatible with P2P communication, the system-control unit 119 registers the MAC address that is included in the connection request in the MAC address list 113a that is managed by the connection-information-management unit 113. Furthermore, when the communication-control unit 112 receives a connection request from the portable terminal 300B that is not compatible with P2P communication, the system-control unit 119 responds to the connection request from the portable terminal 300B when the MAC address of the portable terminal 300B is not registered in the MAC address list 113a. When the MAC address of the portable terminal 300B is registered in the MAC address list 113a, the system-control unit 119 responds to the connection request from the portable terminal 300B when the user allows the connection. The system-control unit 119 also responds to a connection request from the portable terminal 300B when the user deletes the MAC address of the portable terminal 300B that is registered in the MAC address list 113a.

However, the portable terminal 300A includes a control unit 310 that controls an antenna 301 and a panel unit 302. The antenna 301 transmits and receives radio waves to and from the relay device 200 and to and from the transmission/reception unit 103 of the MFP 100. The panel unit 302 is a device such as a touch panel that performs selection of various functions of the portable terminal 300A, and the like.

The control unit 310 is a processor that controls the overall operation of the portable terminal 300A by executing a control program and the like. The control unit 310 includes a communication-control unit 311, a RAM 312, a ROM 313, a connection-information-management unit 314, a panel-operation-control unit 315 and a system-control unit 316. Moreover, these units are connected to a data bus 317.

The communication-control unit 311, via the antenna 301, performs control of transmission and reception of data with the relay device 200 or MFP 100. The RAM 312 is a work memory for executing programs. A control program for checking the operation of each of the units and the like is stored in the ROM 313. The connection-information-management unit 314 manages wireless-communication-dedicated software, P2P-communication-dedicated software, and connection information. Wireless communication is executed by the wireless-communication-dedicated software. P2P communication is executed by the P2P-communication-dedicated software. Moreover, the connection-information-management unit 314, following an instruction from the system-control unit 119, activates the wireless-communication-dedicated software and the P2P-communication-dedicated software. Connection information includes an SSID (Service Set Identifier), an encryption key, a MAC address and the like. In the case of portable terminal 300B, the connection-information-management unit 314 does not manage P2P-communication-dedicated software for executing P2P communication, however, manages wireless-communication-dedicated software for executing wireless communication, and connection information. The panel-operation-control unit 315 controls the display operation of the panel unit 302.

The system-control unit 316 control cooperative operation of each of the units. Moreover, when the panel-operation control unit 315 receives a connection request for the MFP 100 via the panel unit 302, the system-control unit 316 transmits the connection request to the MFP 100 via the communication-control unit 311.

Next, an example of the contents displayed in the panel unit 104 of the MFP 100 will be explained with reference to FIG. 3A and FIG. 3B.

First, FIG. 3A illustrates the confirmation screen 104*a* that is displayed when there is a connection request from the portable terminal 300B that is not compatible with P2P communication, for example. This confirmation screen 104*a* is a screen that prompts selecting whether or not to allow the connection request. This confirmation screen 104*a* is displayed when there is a display request for displaying the confirmation screen 104*a* via the panel unit 104. The MAC address and the like of the portable terminal 300B for which there is a connection request is displayed on the confirmation screen 104*a*. Moreover, a touch-operated OK button 104*c* that is touched when allowing the connection request, and a touch-operated NO button 104*d* that is touched when not allowing the connection request are displayed on the confirmation screen 104*a*. The user that sets the connection request from the portable terminal 300B checks the contents of the confirmation screen 104*a*, and when the OK button 104*c* is touched, the system-control unit 119 responds to the connection request from the portable terminal 300B. However, when the NO button 104*d* is touched by the user, the system-control unit 119 does not respond to the connection request from the portable terminal 300B.

On the other hand, FIG. 3B illustrates a MAC address list screen 104*b* that prompts deletion of a MAC address. A MAC address list 113*a*, a delete button 104*e*, and a return button 104*f* are displayed on the MAC address list screen 104*b*. The connection-information-management unit 113 manages the MAC address list 113*a*. The delete button 104*e* is touched when deleting a MAC address. The return button 104*f* returns the MAC address list screen 104*b* to the previous screen. This MAC address list screen 104*b* is displayed when there is a display request for displaying the MAC address list 113*a* via the panel unit 104. Here, when deleting the MAC address XX:XX:XX:XX:XX:XX, for example, the area where XX:XX:XX:XX:XX:XX is displayed is touched, and then the delete button 104*e* is touched. As a result, the system-control unit 119 deletes the MAC address XX:XX:XX:XX:XX:XX from the MAC address list. In doing so, the system-control unit 119 responds to a connection request from the portable terminal B that corresponds to the deleted MAC address. However, the system-control unit 119 does not respond to connection requests from portable terminals 300B that correspond to MAC addresses that are registered in the MAC address list 113*a*. Moreover, the system-control unit 119 registers the MAC address of the portable terminal 300B for which a response was given in the MAC address list 113*a* again.

Next, the connection process on the MFP 100 side will be explained with reference to FIG. 4. In the following, the case when determining whether or not the portable terminal 300A or 300B is P2P compatible is explained.

(Step S101)

The system-control unit 119 determines whether or not there is a connection request.

In this case, when there is no notification indicating that a connection request for portable terminal 300A or 300B is received from the communication-control unit 112, the system-control unit 119 determines that there is no connection request (step S101: NO).

However, when there is a notification indicating that a connection request for portable terminal 300A or 300B is received from the communication-control unit 112, the system-control unit 119 determines that there is a connection request (step S101: YES), and proceeds to step S102.

(Step S102)

The system-control unit 119 checks the request contents.

(Step S103)

The system-control unit 119 determines whether or not there is direct connection information in the request contents.

Direct connection information is, for example, a P2P IE (Peer-to-Peer Information Element) and the like.

When the system-control unit 119 determines that there is direct connection information in the request contents (step S103: YES), the system-control unit 119 proceeds to step S104.

However, when the system-control unit 119 determines that there is no direction connection information in the request contents (step S103: NO), the system-control unit 119 proceeds to step S105.

(Step S104)

The system-control unit 119 determines that a device is compatible with P2P communication.

In this case, the system-control unit 119 determines that the device that is compatible with P2P communication is portable terminal 300A.

(Step S105)

The system-control unit 119 responds to a connection request and establishes a connection with the portable terminal 300A by P2P communication, then ends processing.

(Step S106)

The system-control unit 119 determines that a device is not compatible with P2P communication.

In this case, the system-control unit 119 determines that the device that is not compatible with P2P communication is portable terminal 300B, and then proceeds to step S107.

(Step S107)

The system-control unit 119 executes a re-connection process for re-connecting with a device that is not compatible with P2P communication. The re-connection process will be described in detail later.

(Step S108)

The system-control unit 119 registers the MAC address.

In this case, the system-control unit 119 registers the MAC address that is included in the connection request from the portable terminal 300B in the MAC address list 113a that is managed by the connection-information-management unit 113, and then ends processing.

In step S108, when the MAC address that is included in the connection request is already registered in the MAC address list 113a, the connection-information-management unit 113 does not need to register the MAC address that is included in the connection request again. In other words, in step S108, when the MAC address that is included in the connection request is not already registered in the MAC address list 113a, the connection-information-management unit 113 may register the MAC address that is included in the connection request.

Next, an example of the re-connection process on the MFP 100 side that corresponds to step S107 illustrated in FIG. 4 will be explained with reference to FIG. 5. The re-connection process described below will be explained for the case in which there is a display request for the confirmation screen 104a. Moreover, in the explanation below, it is presumed that there is a connection request for wireless communication from the portable terminal 300B that is not compatible with P2P communication, or that there is no direct connection information in the request contents of the connection request.

(Step S201)

The system-control unit 119 determines whether or not there is a connection request.

In this case, when there is no notification indicating that a connection request for the portable terminal 300B is received from the communication-control unit 112, the system-control unit 119 determines that there is no connection request (step S201: NO).

However, when there is a notification indicating that a connection request for portable terminal 300B is received from the communication-control unit 112, the system-control unit 119 determines that there is a connection request (step S201: YES), and proceeds to step S202.

(Step S202)

The system-control unit 119 compares the MAC address.

In this case, the system-control unit 119 compares the MAC address that is included in the connection request with the MAC addresses that are registered in the MAC address list 113a that is managed by the connection-information-management unit 113.

(Step S203)

The system-control unit 119 determines whether or not there is a match.

In this case, when the MAC address that is included in the connection request is not registered in the MAC address list 113a that is managed by the connection-information-management unit 113, the system-control unit 119 determines that there is no match (step S203: NO), and proceeds to step S208.

However, when the MAC address that is included in the connection request is registered in the MAC address list 113a that is managed by the connection-information-management unit 113, the system-control unit 119 determines that there is a match (step S203: YES), and proceeds to step S204.

(Step S204)

The system-control unit 119 determines whether or not there is a display request for the confirmation screen 104a.

In this case, when there is no notification from the panel-operation-control unit 117 indicating that there is a display request for the confirmation screen 104a via the panel unit 104, the system-control unit 119 determines that there is no display request for the confirmation screen 104a (step S204: NO), and proceeds to step S209.

However, when there is a notification from the panel-operation-control unit 117 indicating that there is a display request for the confirmation screen 104a via the panel unit 104, the system-control unit 119 determines that there is a display request for the confirmation screen 104a (step S204: YES), and proceeds to step S205.

A display request button for displaying the confirmation screen 104a may be displayed on the panel unit 104, and the panel-operation-control unit 117 may notify the system-control unit 119 of the display request for the confirmation screen 104a after that display request button is touched.

Moreover, when determining whether or not there is a display request for the confirmation screen 104a, the system-control unit 119 may determine that there is no display request for the confirmation screen 104a when there is no notification from the panel-operation-control unit 117 within a fixed amount of time.

(Step S205)

The system-control unit 119 displays the confirmation screen 104a.

In this case, the system-control unit 119, via the panel-operation-control unit 117, causes the panel unit 104 to display the confirmation screen 104a.

(Step S206)

The system-control unit 119 determines whether or not to allow a connection.

In this case, when there is a notification from the panel-operation-control unit 117 indicating that the OK button 104c has been touched, the system-control unit 119 determines to allow the connection (step S206), and proceeds to step S207.

However, when there is a notification from the panel-operation-control unit 117 indicating that the NO button 104d has been touched, the system-control unit 119 determines not to allow the connection (step S206: NO), and proceeds to step S209.

(Step S207)

The system-control unit 119 responds to the connection request, establishes a connection with the portable terminal 300B using wireless communication, then ends processing and proceeds to step S108 illustrated in FIG. 4.

Here, the user has touched the OK button 104c on the confirmation screen 104a, so the system-control unit 119 responds to the connection request because the connection request is not for an automatic connection (described later) that is not intended by the user.

(Step S208)

The system-control unit 119 allows the connection, ends the process illustrated in FIG. 5, and proceeds to step S108 illustrated in FIG. 4.

Here, the process for allowing a connection is based on the MAC address that is included in the connection request not being registered in the MAC address list 113a that is managed by the connection-information-management unit 113. In other words, when the MAC address that is included in the connection request is not registered in the MAC address list 113a, the connection is presumed to be the first from the portable terminal 300B and not a connection request for an automatic connection (described later) not intended by the user. Allowing the connection referred to here, as in step S207, means responding to the connection request and establishing a connection with the portable terminal 300B using wireless communication.

(Step S209)

The system-control unit 119 ends the process illustrated in FIG. 5 without responding to the connection request, then proceeds to step S108 illustrated in FIG. 4.

The process of not responding to the connection request referred to here is based on the MAC address that is included in the connection request being registered in the MAC address list 113a that is managed by the connection-information-management unit 113, and there not being a display request for the confirmation screen 104a from the user in step S204. In other words, when the MAC address that is included in the connection request is registered in the MAC address list 113a, the connection is not the first from the portable terminal 300B. Moreover, there not being a display request from the user for the confirmation screen 104a in step S204 is because it is presumed that the connection request is not a connection request for an automatic connection (described later) that is not intended by the user.

Next, another example of a re-connection process on the MFP 100 side that corresponds to step S107 illustrated in FIG. 4 will be explained with reference to FIG. 6. The re-connection process that will be explained below is for the case in which there is a display request for the MAC address list screen 104b, or when there is no direct connection information in the request contents of the connection request. Moreover, the explanation below, as in the explanation above, is for the case in which there is a connection request for wireless communication from the portable terminal 300B that is not compatible with P2P communication.

(Step S301)

The system-control unit 119 determines whether or not there is a connection request.

In this case, when there is no notification from the communication-control unit 112 indicating that a connection request from the portable terminal 300B is received, the system-control unit 119 determines that there is no connection request (step S301: NO).

However, when there is a notification from the communication-control unit 112 indicating that a connection request from the portable terminal 300B is received, the system-control unit 119 determines that there is a connection request (step S301: YES), and proceeds to step S302.

(Step S302)

The system-control unit 119 compares MAC addresses.

In this case, the system-control unit 119 compares the MAC address that is included in the connection request with the MAC addresses that are registered in the MAC address list 113a that are managed by the connection-information-management unit 113.

(Step S303)

The system-control unit 119 determines whether or not there is a match.

In this case, when the MAC address that is included in the connection request is not registered in the MAC address list 113a that is managed by the connection-information-management unit 113, the system-control unit 119 determines that there is no match (step S303: NO), and proceeds to step S308.

However, when the MAC address that is included in the connection request is registered in the MAC address list 113a that is managed by the connection-information-management unit 113, the system-control unit 119 determines that there is a match (step S303: YES), and proceeds to step S304.

(Step S304)

The system-control unit 119 determines whether or not there is a display request for the MAC address list screen 104b.

In this case, when there is no notification from the panel-operation-control unit 117 indicating that there is a display request for the MAC address list screen 104b via the panel unit 104, the system-control unit 119 determines that there is no display request for the MAC address list screen 104b (step S304: NO). The system-control unit 119 then proceeds to step S309.

However, when there is a notification from the panel-operation control unit 117 indicating that there is a display request for the MAC address list screen 104b via the panel unit 104, the system-control unit 119 determines that there is a display request for the MAC address list screen 104b (step S304: YES). The system-control unit 119 then proceeds to step S305.

A display request button for the MAC address list screen 104b may be displayed on the panel unit 104, and the panel-operation-control unit 117 may notify the system-control unit 119 of a display request for the MAC address list screen 104b when that display request button is touched.

Moreover, when determining whether or not there is a display request for the MAC address list screen 104b, the system-control unit 119 may determine that there is no display request for the MAC address list screen 104b when there is no notification from the panel-operation-control unit 117 within a fixed amount of time.

(Step S305)

The system-control unit 119 displays the MAC address list screen 104b.

In this case, the system-control unit 119, via the panel-operation-control unit 117, causes the panel unit 104 to display the MAC address list 104b.

(Step S306)

The system-control unit 119 determines whether or not a MAC address has been deleted.

In this case, when there is a notification from the panel-operation-control unit 117 indicating that the delete button 104e has been touched, the system-control unit 119 determines that the MAC address has been deleted (step S306: YES), and proceeds to step S307.

However, when there is no notification from the panel-operation-control unit 117 indicating that the delete button 104e has been touched, the system-control unit 119 determines that the MAC address is not deleted (step S306: NO), and proceeds to step S309.

In step S306, when determining that the MAC address is deleted, it is presumed that the system-control unit 119 executes a process for checking whether or not the deleted MAC address matches the MAC address that is included in the connection request.

(Step S307)

The system-control unit 119 responds to the connection request, establishes a connection with the portable terminal 300B using wireless communication, ends processing and proceeds to step S108 illustrated in FIG. 4.

Here, the user deletes the MAC address on the MAC address list screen 104b, so the system-control unit 119 responds to the connection request because the connection request is not a connection request for automatic connection (described later) that is not intended by the user.

(Step S308)

The system-control unit 119 allows the connection, ends the process illustrated in FIG. 5, and proceeds to step S108 illustrated in FIG. 4.

Here, the process for allowing the connection is based on the MAC address that is included in the connection request not being registered in the MAC address list 113a that is managed by the connection-information-management unit 113. In other words, this is because when the MAC address that is included in the connection request is not registered in the MAC address list 113a, the connection is presumed to be the first for the portable terminal 300B, and the connection request is presumed not to be a connection request for automatic connection (described later) that is not intended by the user. Allowing the connection referred to here is the same as in step S307 and is responding to the connection request and establishing a connection with the portable terminal 300B using wireless communication.

(Step S309)

The system-control unit 119 ends the process illustrated in FIG. 5 without responding to the connection request, and proceeds to step S108 illustrated in FIG. 4.

The process of not responding to the connection request referred to here is based on the MAC address that is included in the connection request being registered in the MAC address list 113a, and there not being a display request from the user in step S304 for the MAC address list screen 104b. The MAC address list 113a is managed by the connection-information-management unit 113. In other words, this is because when the MAC address that is included in the connection request is registered in the MAC address list 113a, the connection is not the first from the portable terminal 300B. Moreover, there not being a display request from the user in step S304 for the MAC address list screen 104b is because it is presumed that the connection request is a connection request for automatic connection (described later) that is not intended by the user.

In this way, in this embodiment, the communication-control unit 112 controls wireless communication via an access point and P2P type communication (P2P communication). The connection-information-management unit 113 manages the MAC address list 113a in which the MAC address of the portable terminal 300B (client) from which there is a connection request using wireless communication is registered. When the communication-control unit 112 receives a connection request from the portable terminal 300B by wireless communication, the system-control unit 119 compares the MAC address that is included in the connection request with the MAC address list 113a. When the MAC address is not registered in the MAC address list 113a, the system-control unit 119 responds to the connection request.

By responding to the connection request in this way when the MAC address is not registered in the MAC address list 113a, it is possible to prevent an unintended connection request from being received from the portable terminal 300B (client) side, and thus it is possible to prevent a shortage of wireless LAN resources.

In the typical technology, when a specified communication party is a device that satisfies specified conditions, wireless communication is established, so the possibility of specifying a communication device that is not intended by the user as a communication party is eliminated.

Incidentally, since a function corresponding to that of an access point (AP) is installed in a device that is compatible with P2P communication, when one device is compatible with P2P communication, communication becomes possible even though the other device (device that is compatible with normal Wi-Fi (registered trademark) standard) is not compatible with P2P communication.

Moreover, in the case of devices that are compatible with P2P communication, by one of the devices becoming a device that corresponds to being an access point (AP) (group owner (GO)), plural devices (clients) in a group that uses the group owner (GO) are able to communicate with the other devices via the group owner (GO) in the same way as in the case of an access point (AP) of a wireless LAN using Wi-Fi (registered trademark) (Infrastructure mode).

Furthermore, in the case of devices that are compatible with P2P communication, when disconnection is selected on the client side (for example), communication ends with the group owner (GO). However, in the case of a client that is not compatible with P2P communication, when disconnection is selected, even though communication with the group owner (GO) temporarily ends, it is possible that a connection may be made again automatically. In other words, in the case of a client that is not compatible with P2P communication, communication with the group owner (GO) is performed based on an access point. Therefore, even though disconnection is selected on the client side, when the Wi-Fi (registered trademark) communication function is still effective, a connection will be established automatically based on the access point history unless the access point history is deleted.

As a result, a problem occurs in that the group owner (GO) side receives an unintended connection request from the client side, and a shortage of wireless LAN resources may occur.

Incidentally, when disconnection is selected on the client side, it is possible to stop an unintended automatic connection from the client side by disabling the Wi-Fi (registered trademark) communication function, or deleting the access point history. However, every time the Wi-Fi (registered trademark) communication function is used, it becomes necessary to perform operation to enable the Wi-Fi (registered trademark) communication function and select and set an access point. In this case, when taking into consideration the convenience of the user, blocking unintended connection requests from the client side on the group owner (GO) side is considered effective.

With the communication device and communication program of the present disclosure, unintended connection requests are not received from the client side, so it is possible to prevent a shortage of wireless LAN resources.

In the present embodiment, an example of a MFP 100 as a communication device was given, however, the embodiment is not limited to this example, and of course it is also possible to use other devices that are compatible with P2P communication such as cameras, televisions, game machines and the like as well as the portable terminal 300A.

What is claimed is:
1. A communication device, comprising:
   a communication-control unit that controls first communication by wireless communication via an access point, and second communication by peer-to-peer ("P2P") type communication;
   a connection-information-management unit that manages a media access control ("MAC") address list in which MAC addresses of clients from which there has been a request for connection by the first communication are registered;
   a panel unit; and
   a system-control unit;
   wherein
   when the communication-control unit receives a connection request from a client by the first communication, the system control unit compares a MAC address that is included in the connection request with the MAC address list, when the MAC address that is included in the connection request is determined to not be registered in the MAC address list as a result of the comparison of the MAC address that is included in the connection request with the MAC address list, (i) the system-control unit responds to the connection request from the client and establishes a connection with the client by the first communication, and (ii) the connection-information-management unit registers the MAC address of the client from which there is the connection request, when the MAC address that is included in the connection request is determined to be already registered in the MAC address list as a result of comparison of the MAC address that is included in the connection request with the MAC address list, the system-control unit (i) causes the panel unit to display the MAC address list, responds to the connection request and establishes a connection with the client by the first communication when there is an instruction to delete the MAC address from the MAC address list, and does not establish the connection with the client by the first communication when there is no instruction to delete the MAC address from the MAC address list, and after the system control unit responds to the connection request and establishes a connection with the client by the first communication in response to the instruction to delete the MAC address from the MAC address list, the connection information management unit registers the MAC address of the client from which there has been the connection request by the first communication.

2. A non-transitory computer readable recording medium that stores a communication program that can be executed by a computer of a communication device, and when the communication program is executed, causes the computer to:

by a communication-control unit, control first communication by wireless communication via an access point, and second communication by peer-to-peer ("P2P") type communication;

by a connection-information-management unit, manage a media access control ("MAC") address list in which MAC addresses of clients from which there has been a request for connection by the first communication are registered; and by a system-control unit, when a communication-control unit receives a connection request from a client by the first communication, compare a MAC address that is included in the connection request with the MAC address list, wherein when the MAC address that is included in the connection request is determined to not be registered in the MAC address list as a result of the comparison of the MAC address that is included in the connection request with the MAC address list, (i) the system-control unit responds to the connection request from the client and establishes a connection with the client by the first communication, and (ii) the connection-information-management unit registers the MAC address of the client from which there is the connection request, when the MAC address that is included in the connection request is determined to be already registered in the MAC address list as a result of comparison of the MAC address that is included in the connection request with the MAC address list, the system-control unit (i) causes a panel unit to display the MAC address list, responds to the connection request and establishes a connection with the client by the first communication when there is an instruction to delete the MAC address from the MAC address list, and does not establish the connection with the client by the first communication when there is no instruction to delete the MAC address from the MAC address list, and after the system control unit responds to the connection request and establishes a connection with the client by the first communication in response to the instruction to delete the MAC address from the MAC address list, the connection information management unit registers the MAC address of the client from which there has been the connection request by the first communication.

3. The communication device according to claim 1, wherein the instruction is made via the panel unit.

4. The non-transitory computer readable recording medium according to claim 2, wherein the instruction is made via the panel unit.

* * * * *